United States Patent

Nakajima

Patent Number: 5,218,460
Date of Patent: Jun. 8, 1993

[54] METHOD FOR PATTERN SELECTION INVOLVING SCALING-UP CIRCUMSCRIBED RECTANGLES

[75] Inventor: Yoshiyasu Nakajima, Kaisei, Japan

[73] Assignee: Fuji Photo Film Co., Ltd., Kanagawa, Japan

[21] Appl. No.: 685,764

[22] Filed: Apr. 16, 1991

[30] Foreign Application Priority Data

Apr. 19, 1990 [JP] Japan .................................. 2-103771

[51] Int. Cl.$^5$ ............................................. H04N 1/40
[52] U.S. Cl. .................................. 358/456; 358/457; 358/458; 382/54
[58] Field of Search ..................... 358/462, 451-453, 358/456-458; 382/22, 54, 56

[56] References Cited

U.S. PATENT DOCUMENTS

| | | | |
|---|---|---|---|
| 4,396,903 | 8/1983 | Habicht et al. | 382/22 |
| 4,578,714 | 3/1986 | Sugiura et al. | 358/457 |
| 4,606,069 | 8/1986 | Johnsen | 382/56 |
| 4,783,840 | 11/1988 | Song | 382/54 |
| 4,901,363 | 2/1990 | Toyokawa | 358/456 |
| 4,905,294 | 2/1990 | Sugiura et al. | 358/456 |
| 5,109,282 | 4/1992 | Peli | 358/458 |

Primary Examiner—Stephen Brinich
Attorney, Agent, or Firm—Sughrue, Mion, Zinn, Macpeak & Seas

[57] ABSTRACT

The image processing system of this invention provided with an input controller, a file server, an image setter and a work station each having respectively an independent CPU (microprocessor, microcomputer and the like) allows each unit to operate independently in overlap manner so as to carry out image processing efficiently at a high speed, while a hardcopy or a blockcopy for printing with a high quality image being fit into a frame on a layout pasteboard by means of an image output apparatus can be obtained by interactive-editing information of the layout pasteboard as well as designs and characters synthetically, to minimize the capacity of the memory. In addition, when one of the displayed patterns is to be selected, since this system is adapted to make, with regard to all the patterns to be judged, a circumscribed rectangle for each, and to form a circumscribed rectangle scaled up by the tolerance from each of them so as to adopt only the patterns which include the indicated point, as selection candidates, it is possible to perform a pattern selection effectively at a high speed.

3 Claims, 9 Drawing Sheets

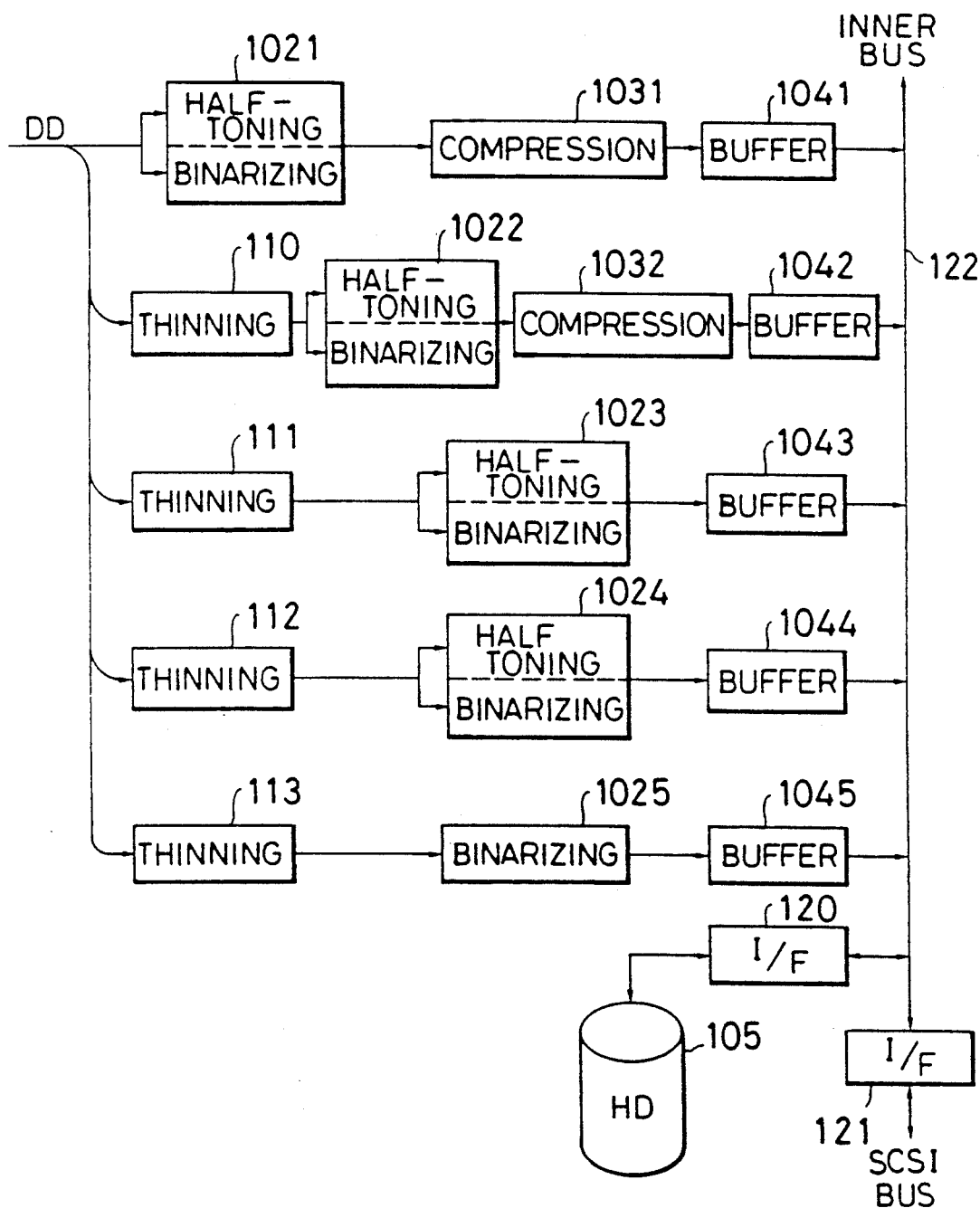
F I G. 2

METHOD FOR PATTERN SELECTION INVOLVING SCALING-UP CIRCUMSCRIBED RECTANGLES

BACKGROUND OF THE INVENTION

1. Field of the Invention

This invention relates to a method for pattern selection in an image processing system which reads out an image of characters and an image of designs drawn on a layout pasteboard (blockcopy pasteboard, rough design sheet or the like) to carry out a layout-designed output.

2. Description of the Prior Art

It has been heretofore desirable to provide an image processing system for typographers who require high quality printed matter in which characters, designs or the like are consolidated as a whole for editing the same. Notwithstanding, such system has not been proposed but is less capable and practical in use even if it is available.

Particularly, among others, a desk top publishing art has been gradually realized in a manner of description such as a Postscript and the like, but is still less capable and efficient of an image art. System for typographers has been of course, available but is insufficient in handling (input, display, storage, processing, edition, and output and the like) data in bulk and at a high speed. This is because that data consisting of information on characters and images is too much to be synthetically processed by a description language and a central processing unit (CPU; software), thus exhibiting a poor performance. In the case of outputting only code data for preparing a block copy for printing, it is necessary to convert the code data to bit map data for each character and further to in advance develop it to the bit map data every some rasters. In the case of outputting only the bit map data, the whole or a part of the output image is stored in a temporary buffer and then transferred to an output unit. However, in order to reduce the memory capacity of the above buffer, the output unit awaits during the time when the output image is stored in the buffer.

However, the apparatus described above can not simultaneously output characters and pictures layout-designed and has a defect that it needs much time to realize even if the apparatus can in advance carry out a layout of the character bit map in the buffer which outputs the bit map. Alternatively, the apparatus outputs the characters and the pictures separately on different papers or photographic films, respectively, therefore an operator have had to patch on the paper or photographic film. Under these situations, it takes much time due to the repetition work such as exposure or printing, and photo-sensitive materials intermediately produced are wasted.

Further, in order that patterns may be indicated and selected on the display image by means of a pointing device such as a mouse or the like, there is generally used a method by which an intersection is to be sought between the costituent line segments of a pattern and a region including a permissible error range, having an indicated point as a center (Japanese Patent Laid-open No. 249269/1988). This method, however, tends to allow patterns considerably far from the indicated point to be candidates for selection, thus exhibiting a difficulty in selection a pattern to be indicated effectively in a short period of time.

SUMMARY OF THE INVENTION

This invention has been achieved in view of what is discussed above, and an object of the invention is to provide a pattern-selecting method in an image processing system which interactively edits and processes a large quantity of image data of characters and pictures electronically at a high speed, the method by which selection of a pattern is effectively carried out at a high speed when a pattern on the display image is indicated to be selected.

According to one aspect of this invention, for achieving the objects described above, there is provided a pattern selecting method, in an image processing system comprising an input controller to dot an compress density data for an image read out by an input unit and for temporarily staying said compressed image data at a buffer; a work station to picture-edit not only acode information edited by an editing input unit but also said image data by the use of an input operating means and a display means; a file server connected to said input controller and said work station by bus lines for storing said image data, said code information and edited data picture-edited by said work station in a memory means; and an image setter for reading out said edited data stored in said memory means and subjecting said edited data to a required data processing to output the image on the image output unit, which comprises the steps of: when one of patterns displayed on said display means is to be selected by means of said input operating means; adding a tolerance of selection indicating to circumscribed rectangles formed of said patterns so as to make scaled-up circumscribed rectangles; distinguishing, in regard to all displaced patterns, whether or not the indicated point by said input operating means if included in each of the scaled-up circumscribed rectangles in order to remove the patterns not including the indicated point from the selection candidates; and seeking a pattern which includes the indicated point within the peripheral band area scaled up by the tolerance from the constituent line segments of each of the remaining patterns so as to determine the pattern to be selected.

The nature, principle and utility of the invention will become more apparent from the following detailed description when read in conjunction with the accompanying drawings.

BRIEF DESCRIPTION OF THE DRAWINGS

In the accompanying drawings:

FIG. 2 is a block diagram showing one example of the configurations of the input controller;

DESCRIPTION OF THE PREFERRED EMBODIMENT

Figure 1A:
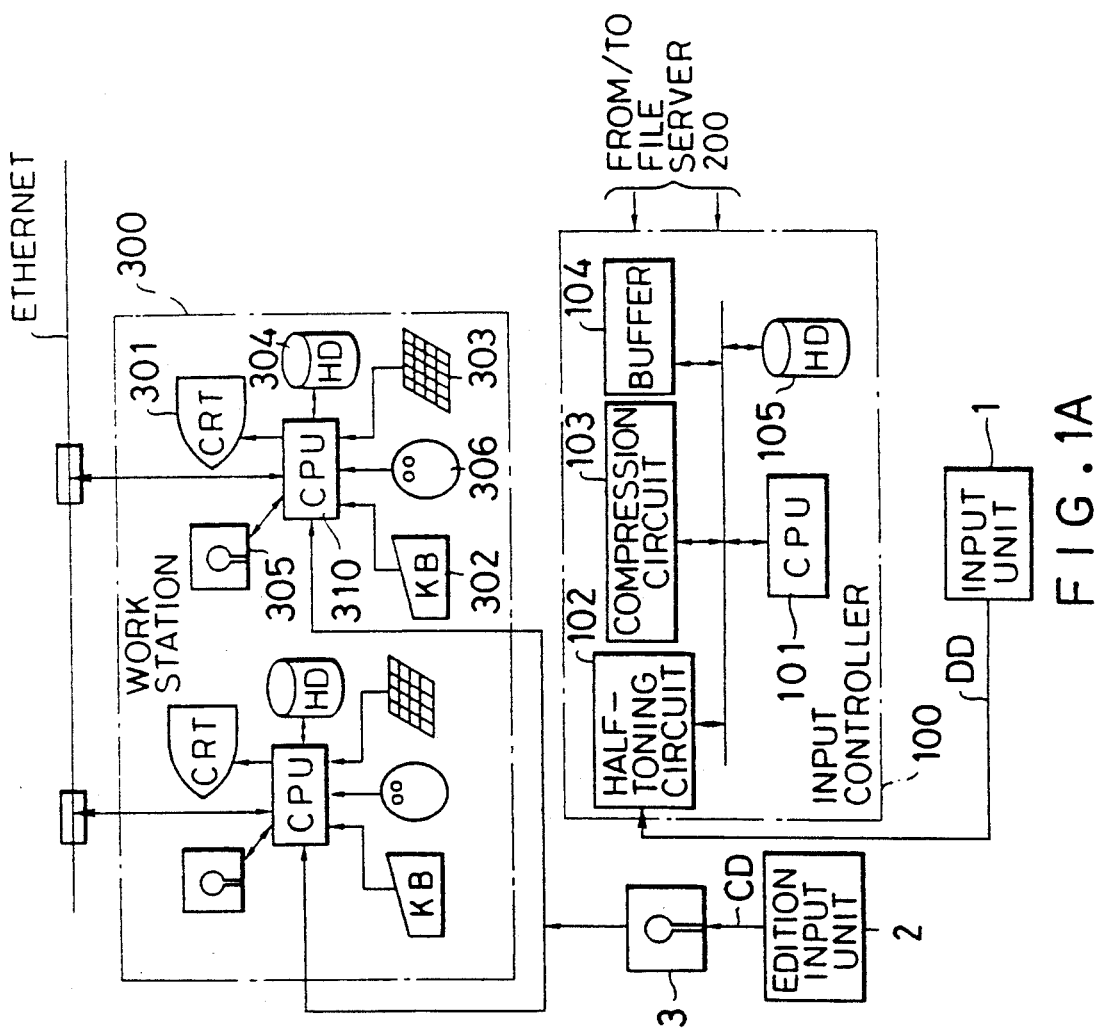
FIGS. 1A and 1B are block diagrams showing the overall configuration of the image processing system to which this invention is applicable.
Figure 1B:
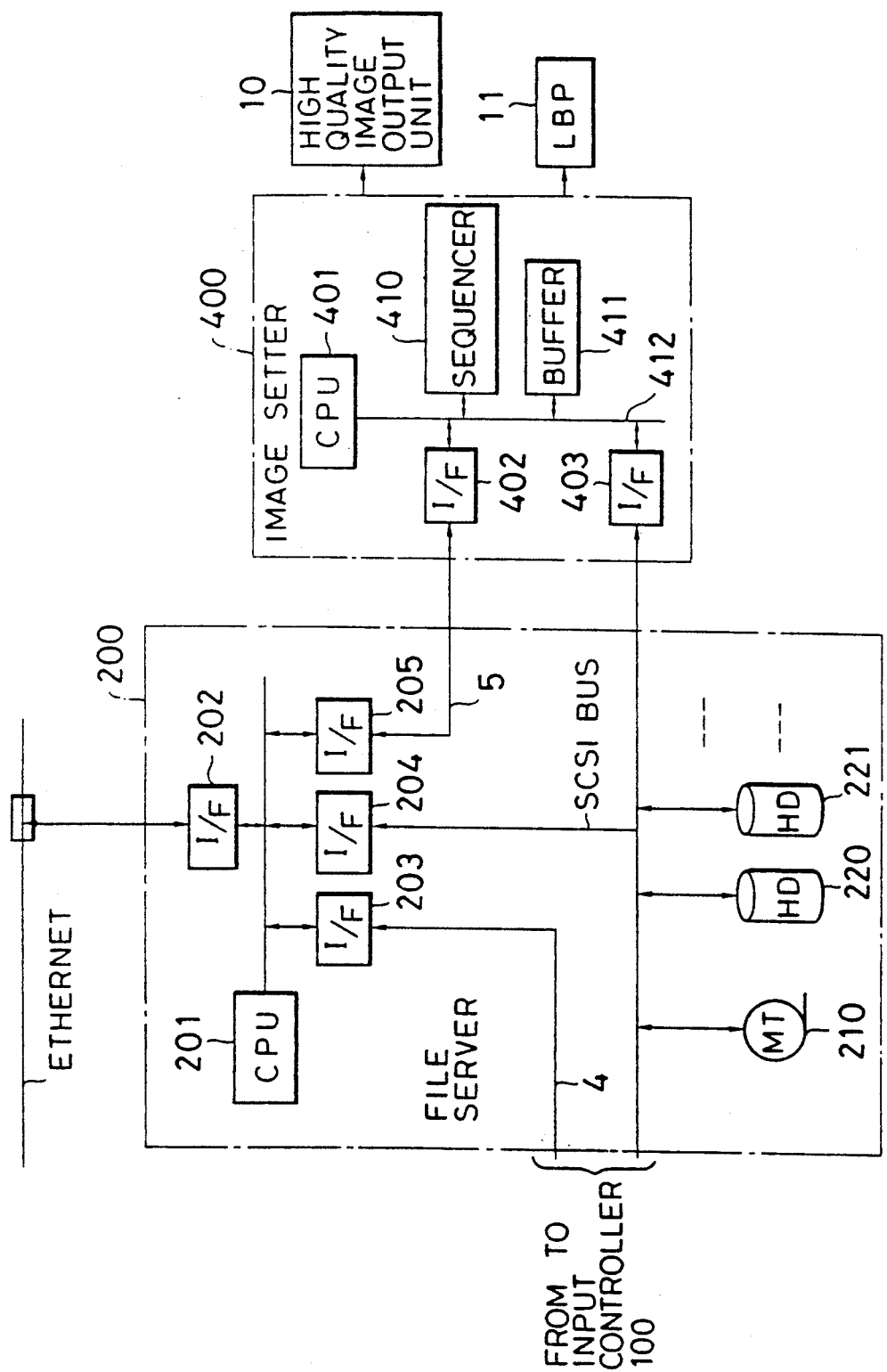

FIGS. 1A and 1B are block diagrams showing the whole arrangement of an image processing system according to this invention. An input unit 1 (such as a scanner or the like) is adapted to read originals such as designs, characters, patterns, in addition, a layout pasteboard and the like. Density data DD of the image as obtained by the input unit 1 is inputted to an input controller 100. The input controller 100 dots the aforementioned inputted density data DD through an incorporated CPU 101 by means of a halftoning circuit 102 and then compressed by a compression circuit 103. The data is temporarily stored in a buffer 104 and transferred for storing them in a magnetic tape 210 of a file server 200 or hard discs 220, 221, . . . thereof. The input controller 100 includes a local disc (hard disc) 105 for temporarily storing the data. The file server 200 is provided with a CPU 201 and connected to the other apparatus through interfaces 202 to 205. A code information CD (such as characters and the like) which is obtained by an edition input unit 2 such as a word processor and composing machine and the like is once stored in a floppy disc 3 and then read out. The code information CD is then inputted to a work station 300. This input may be inputted in on-line. The work station 300 carries a plurality of terminal units each having a CRT 301 as a display means, a keyboard 302, a mouse 306 and a digitizer 303 as input operation means, and a hard disc 304 and a floppy disc 305 as memory means. The work station 300 is interconnected by an Ethernet (one type of bus line system) to the file server 200. Image data, frame data and contour display image data obtained by the input controller 100, which are thinned for the CRT display (for instance, 100 dpi) are stored as well as high density data (not thinned) for the image output, in the magnetic tape 210 or the hard disc 220, 221, . . . Those three data thinned are read out and transferred by interfaces 204, 202 through an SCSI bus to the work station 300. A control command and the like between the work station 300 and the input controller 100 are transferred by the interface 203 of the file server 200 through an auxiliary line 4. The file server 200 is also connected to an image setter 400. More specifically, the image setter 400 is formed with a CPU 401 which is connected by an interface 402 to another auxiliary data line 5 of the file server 200 and is coupled by an interface 403 to the SCSI bus. The image setter 400 further includes a sequencer 410 and a buffer 411 for storing required data. A high quality image output unit 10 for outputting the high quality image (for instance, 1200 dpi) and a laser beam printer 11 for outputting the relatively low quality image are connected to the image setter 400. It is noted that the hard disc 220, 221, . . . are adapted to previously store not only fixed data (bit map data) such as a logo, a crest and the like but also vector font data for outputting characters.

Now, the input unit 1 is adapted to digitize all of designs (gray scale image or halftone image), line image and character image (binary image) as density data (8 bit/picture element). Signals inputted based on 8 bit/picture element, in the case of the design, are dotted by the input controller 100 to produce information of 4 bit/picture element and in the case of the binary image, are converted to information of 1 bit/picture element. Generally the character is inputted from the work station 300 by means of the code, and also may be inputted as an image through the input unit 1. Because in this case the character is inputted as an image, it is handled as an image, more specifically as bit map data, through it looks or expresses a character. In the image setter 400 which performs all of the output operations, because the code and the vector information are wholly converted to the bit map data, the term of "image output" means outputting the bit map data.

In this manner, the image processing system of this invention requires neither manual paste-up of drawings and photographs nor manual photo-composing to facilitate reduction of labour and material.

Now, the input controller 100 will be illustrated with reference to FIG. 2. The input controller 100 is adapted to process the density data DD inputted from the input unit 1 to simultaneously create five sets of data which comprise high density data for the high quality image output unit 10, data for the laser beam printer 11, two types of data for the display of the CRT 310 of the work station 300, and the image data made rough enough to show a contour of the image. Such simultaneous processing of these data in overlap manner enables the system to accelerate the speed so that the data forming operation load of the CPU 101 may be reduced by the hardware. More specifically, the high density data for the high quality image output unit 10 is caused by dotting the density data DD through a halftoning circuit 1021 and data-compressing it through a compression circuit 1031, the compressed data being held temporarily in a buffer 1041. In order to obtain the data using for allowing the laser beam printer 11 of relatively low quality image to output the image, the density data DD is thinned (110) at a predetermined interval (for instance ½) and then the rough data is dotted by another halftoning circuit 1022 and compressed by another compression circuit 1032. The produced data is then temporarily held in another buffer 1042. Further, for the purpose of two types of rougher data for the CRT 301 display, the density data DD is thinned at a predetermined interval and dotted by different halftoning circuits 1023, 1024 and then temporarily held in respective buffers 1043, 1044. For producing the data for the line image which is prepared when a cut-out mask is formed from a halftone image, the data after the Laplacean or the unsharp mask processing for representing the contour data is thinned (113) and then binarized by a binary circuit 1025 and also temporarily stored in a buffer 1045.

With this arrangement, the CPU 101 communicates with the input unit 1 by a data line (not shown) and also communicates through an auxiliary data line 4 and a dual port RAM (not shown) with the file server 200. When a data transmission request from the input unit 1 is made, the CPU 101 is caused to set up the data required for the respective circuits shown in FIG. 2, storing the set-up data in the local disc 105 while a set-up value in association with the auxiliary scanning being set. The density data DD from the input unit 1 is inputted every one line and stored in the buffers 104 (1041 to 1045) upon synchronization of the respective circuits shown in FIG. 2. During the period of this time, the CPU 101 checks not only changeover of the SCSI bus and of a data compressing output buffer 1041 but also a presence of error information from the respective circuits. The data once stored in the buffer 104 and the local disc 105 are sorted by the command of the CPU 101 and outputted to the SCSI bus from without.

The file server 200 is fablicated in the manner as shown in FIGS. 1A and 1B and functions as common file control such as file control and community of files and as control of network communication and communication between units. More specifically, the file server 200 controls through the SCSI bus, the files for the hard discs (220, 221, . . . ) and the magnetic tape 210 and is adapted through the Ethernet to provide function as a software interface for the work station 300. In addition, the file server 200 fulfills utility functions with respect to service for file control information on the input controller 100 and the image setter 400 and with respect to file control via the SCSI bus. Such utility functions are, for instance, a registration of a font and a garbage collection (dust pick-up and disposal) and the like. The registration of the font may be classified into two types. The first type of the font registration is supported by the system, wherein a vector font prepared by another font preparing system is stored as a magnetic tape form in the hard disc of the present image processing system. The other type of the font registration is a registration of external characters which do not exist in the system. In this instance, the font prepared by another system is registered into the system by means of the floppy or magnetic tape.

The file server 200 is adapted to perform service and store the data for transferring the data between the work station 300 and the input controller 100 and between the latter and the image setter 400. The input controller 100 serves to obtain required information about reserving and deleting the region of respective file from the file server 200 through the auxiliary data line 4 and the dual port RAM. For the purpose of registering the data which is once held in the buffer 104 installed in the input controller 100, as the file for the image processing system, information on the file name, the file capacity and the like are transferred to the file server 200 to allow the hard discs 220, 221, . . . on the SCSI bus to access thereto. This will enable the file server 200 to communicate with a directory and to control disc area and the like. The file server 200 is also adapted to transfer the file data by the Ethernet to the work station 300 and receive the data from the work station. At this moment, the file server 200 controls the hard discs (220, 221, . . . ) on the SCSI bus and the magnetic tape 210 under the command of the work station 300 to renew necessary information on the directory and the like. Further, the file server 200 obtaine the command over the image setter 400 and the other command over the magnetic tape, thereby performing service according to those commands. The file server 200 sends a predetermined command through the auxiliary data line 5 and the dual port RAM to the image setter 400, while transferring the file control information in response to the request from the image setter 400, and is adapted to allow the image setter 400 to access directly to the disc data on the SCSI bus. In addition, the file server 200 is adapted to control the utility information as to the whole image processing system by means of the hard discs 220, 221, . . . on the SCSI bus. Here the utility information includes the font information, common files and the like in the system.

Figure 3:
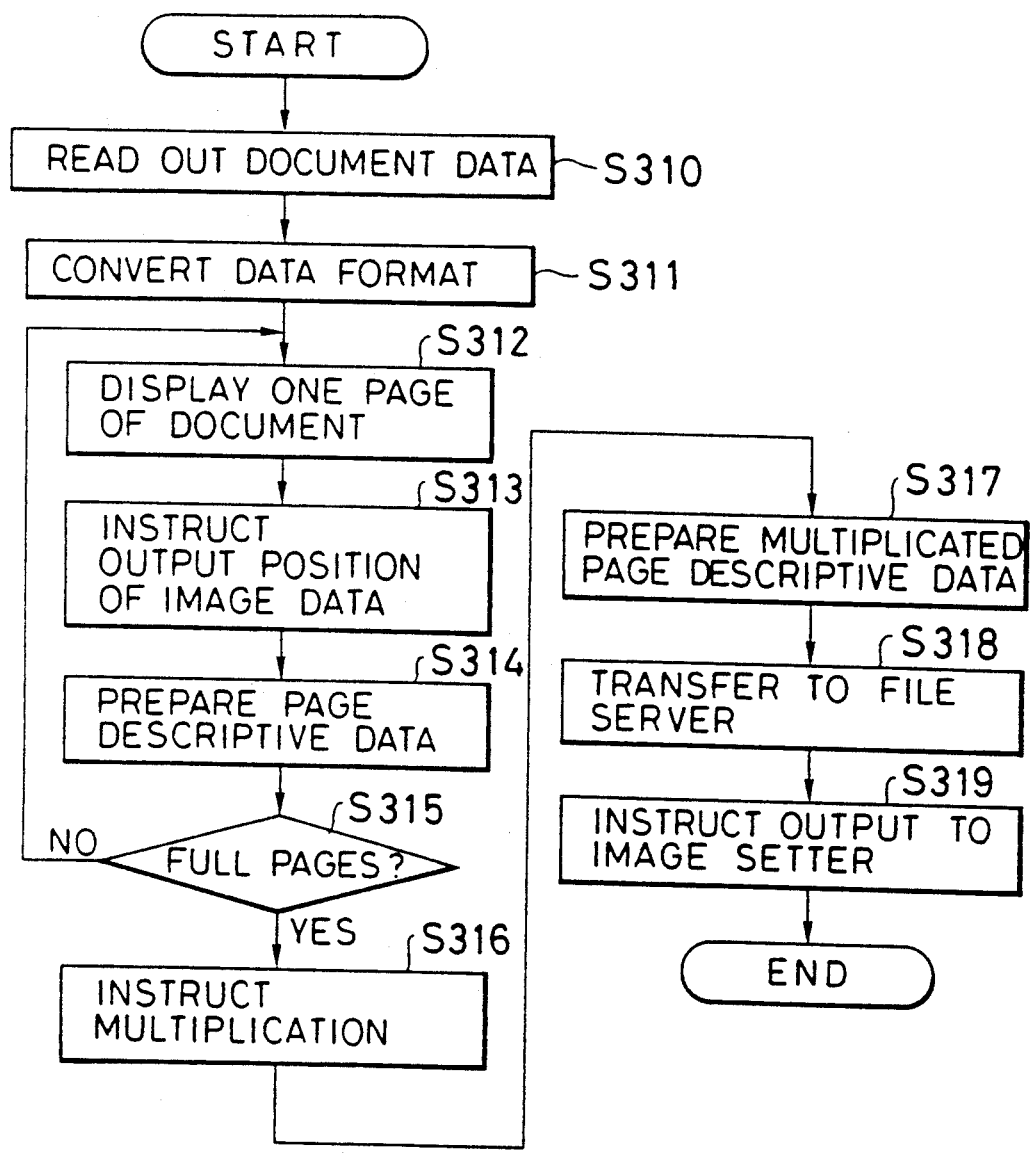
FIG. 3 is a flow chart showing an operation example of the work station.

FIG. 3 is a flow chart showing how the work station 300 functions. Document data edited and stored by the edition input unit 2 is read out of the floppy disc 3 (Step S310). code information CD of the document data is subjected to conversion of the data format (Step S311). Content of the document in one page is then displayed in the CRT 301 (Step S312), while an image data output position of the image which may be read out of a layout pasteboard and the like, is instructed by the mouse 306, the keyboard 302 and the digitizer 303 (Step S313) to prepare the page description data for each page with a frame of the layout pasteboard (Step S314). In this manner, such data is prepared in full pages (Step S315), and then photo-composing for preparing a printing block copy is instructed by the keyboard 302 (Step S316), to obtain photo-composed page description data (Step S317). At the same time, the prepared data is transferred to the file server 200 (Step S318) simultaneously with instructing the image output to the image setter 400 for completing the operation (Step S319).

Figure 4:
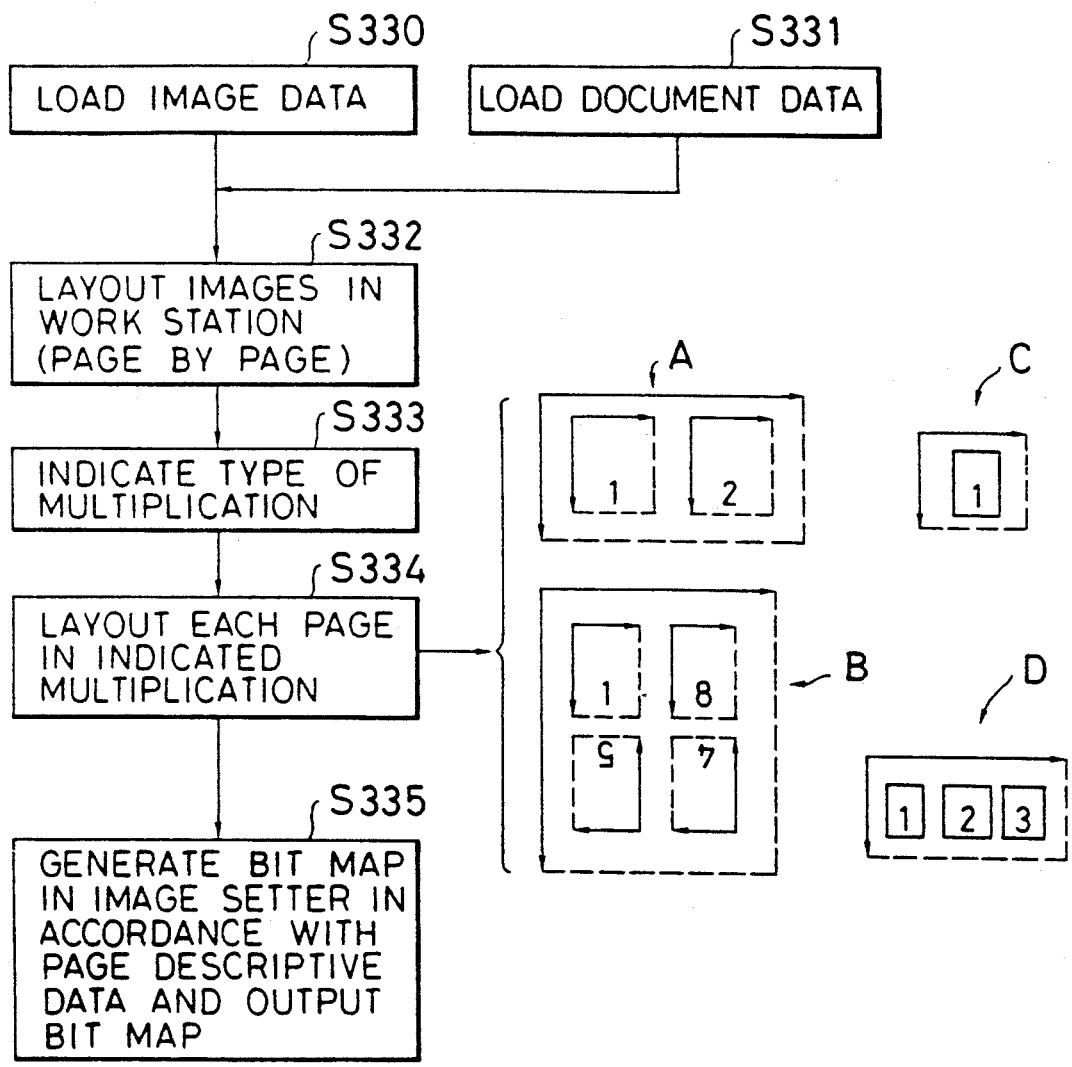
FIG. 4 is a flow chart explaining the operation of photo-composing.

Referring to FIG. 4, the example of the photo-composing process will now be described. The thinned image data in the hard discs 220, 221, . . . of the file server 200 are loaded in the work station 300 (Step S330) while the document data in the floppy disc 3 is loaded in the work station 300 (Step S331). Then, the necessary information is displayed on the CRT 301 of the work station 300, thus making it possible to lay out the image, the document and the frame by page by page, by operating the mouse 306, the keyboard 302 and the digitizer 303 (Step S332). When any of the types of photo-composing registered in advance is indicated via the keyboard 302 (Step S333), each page is displayed on the CRT 301 as being laid out in the indicated photo-composed state (for instance, "A" to "D" as shown in FIG. 4), with a suitable page number being given thereon (Step S334). The photo-composing state of each page is registered and stored with a proper page number being given thereon in advance with consideration given to the process of folding a plurality of pages in book binding and, for instance, takes the form of four pages of paper of trimmed size of A4, or eight pages of paper of a trimmed size of A5. When being selected and indicated any of the types of photo-composing states, the photo-composing state so selected is displayed with the proper page numbers being given to the associated pages (for instance, "1", "8", "5", "4", in FIG. B), as "A" to "D" shown in FIG. 4. The display on the CRT 301 on this occasion is designed to show only the photo-composing states of the pages, and the contents of the pages such as the images and characters thereon are not displayed, bit maps being generated by the image setter 400 in accordance with the page description data and then outputted (Step S335).

Figure 5:
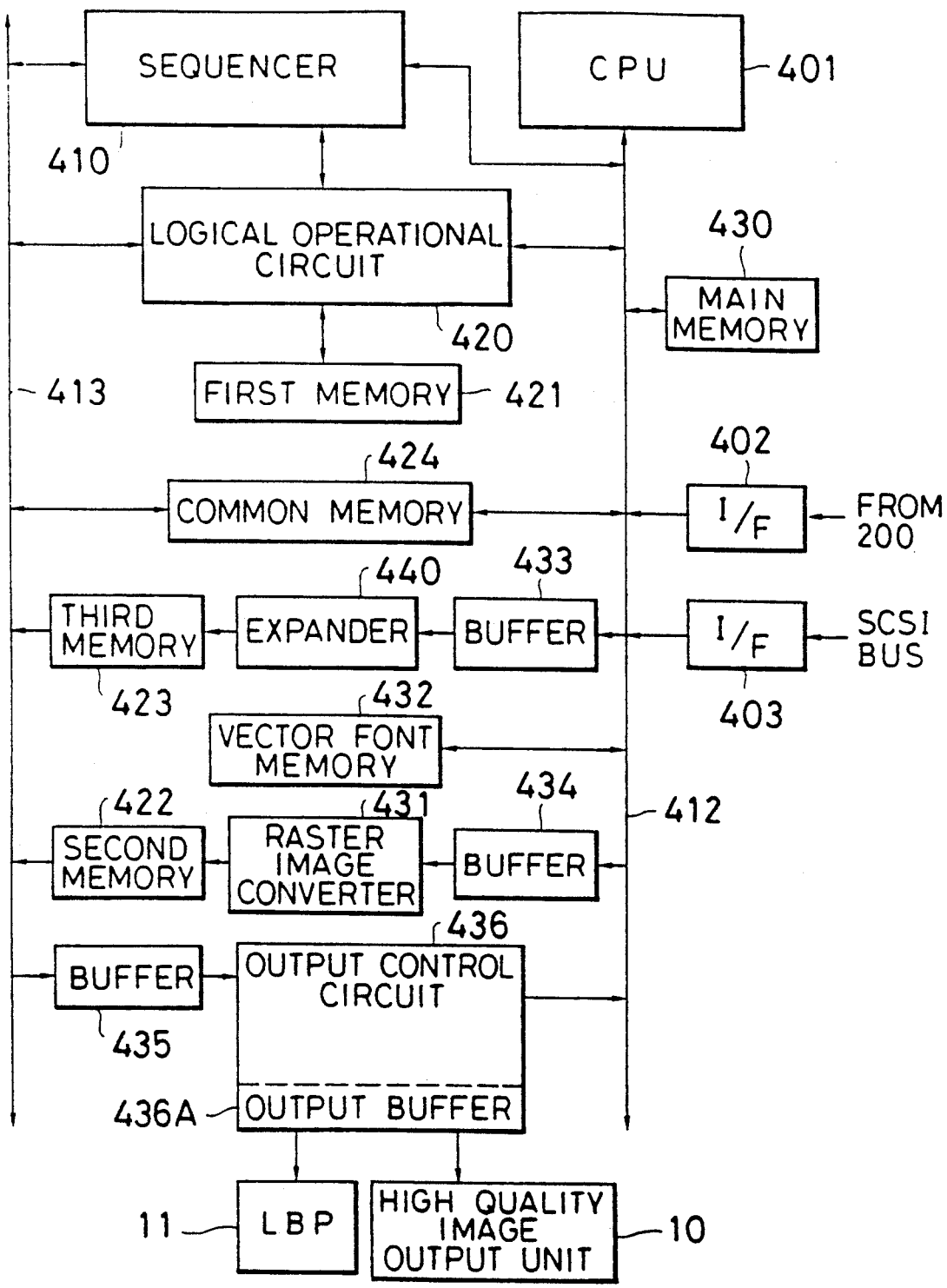
FIG. 5 is a block diagram showing in detail the configuration of the image setter.

FIG. 5 shows in detail an example of the configuration of the image setter 400. A CPU bus 412 and an image data bus 413 are connected to the sequencer 410, and a logical operation circuit 420 and a first memory 421 are also connected to the same sequencer 410. In addition, a main memory 430 for the CPU 401 is connected to the CPU bus 412, and a common memory 424 is disposed between the two buses 412 and 413 so as to connect the former to the latter, the output from the interfaces 402 and 403 being inputted into the CPU bus 412. A buffer 433, an expander 440 and a third memory 423 are connected to each other in that order between the CPU bus 412 and the image data bus 413, and a buffer 434, a raster image converter 431 and a second memory 422 are also connected to each other in that order between the same buses 412 and 413. In addition, a buffer 435 and an output control circuit 436 are also connected to each other between the buses 413 and 412. A vector font memory 432 is connected to the CPU bus 412, and the high quality image output unit 10 and the laser beam printer 11 are respectively connected to the output control circuit 436 via an output buffer 436A.

Vector font is stored in the vector font memory 432, which font is needed at the time when character bit maps are generated by the raster image converter 431. The vector font is normally stored in the discs (220, 221, ...), and it is not efficient to read out them via the SCSI bus every time a character bit map is generated. To deal with this, every needed vector font is designed to be loaded in the vector font memory 432 in advance, thus making it possible to improve the speed at which a character bit map is generated.

Figure 6:
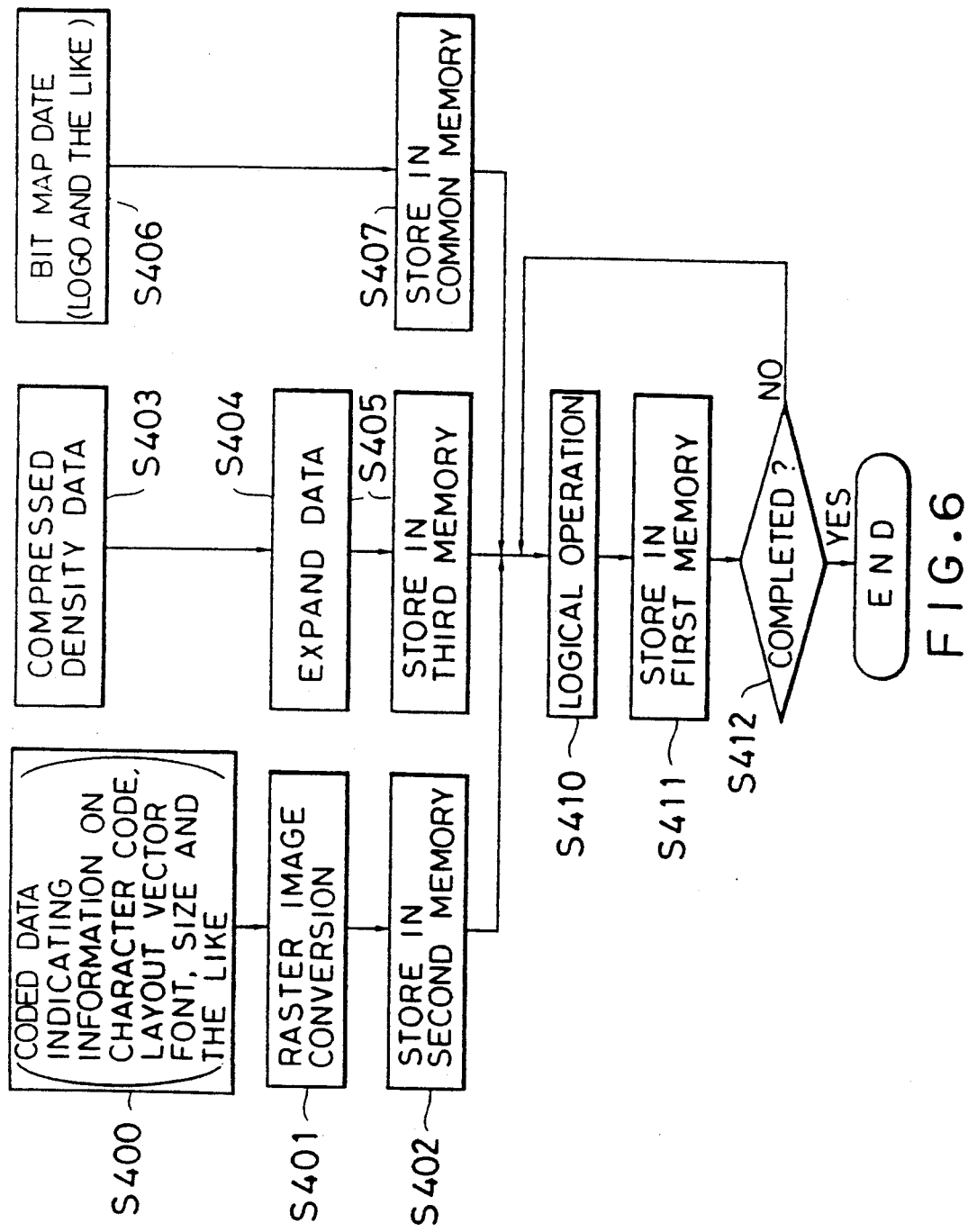
FIG. 6 is a flow chart showing an operation example of the same image setter.

The operation of the image setter 400 which is configured as described above is shown in FIG. 6. At first, a request for output indication is outputted from the file server 200 through the auxiliary data line 5 to the image setter 400 by using a file name stored in the hard discs 220, 221, ... as a parameter. The specification to be outputted is written in the file. While sequentially decoding this specification, address computation of the coded data and the compressed data is performed relative to every image unit, and the overlapping processing by the logical operation is repeated relative to the address, the results of the processing then being stored in the first memory 421. Calling the parameter file via the SCSI bus, the image setter 400 repeats this operation. With regard to the coded data, for instance, the character code and such indicating information as position, type face, size and the like are inputted via the SCSI interface 403 (Step S400), and the raster image conversion of what is inputted is effected by the raster image converter 431 via the buffer 434 (Step S401), the raster image data then being stored in the second memory 422 (Step S402). In addition, the data-compressed image data is sent by way of the SCSI bus and is inputted via the interface 403 (Step S403), and the data is sent by way of the buffer 433 and is expanded by an expander 440 to be reproduced (Step S404), the reproduced image data then being stored in the third memory 423 (Step S405). Moreover, the bit map data such as logotypes and the like which are stored in the hard discs 220, 221, ... are inputted via the interface 403 (Step S406) and are stored in the common memory 424 (Step S407). All data stored in the second memory 422 through the common memory 424 are bit map data, and the logical operation of these stored data is performed via the CPU 401 in the logical operation circuit 420 (Step S410), the data which are so logically operated as to synthesize, edit or image-process pictures, documents or the like are stored in the first memory 421 (Step S411). After the data have been stored in the first memory, a judgement on whether the editing work is to be completed or not, in other words, whether or not there will be further additions or modifications to be made, is made (Step S412), and this operation of the judgement continues until the logical operation of modification or the like has been completed. This logical operation circuit 420 effects in cooperation with the CPU 401, the logical operation of the bit map data generated from the coded data, i.e. characters or the like, the bit map data obtained by expanding the compressed image data and the "sum", "product", "difference", "exclusive-or" and the like of the bit maps, so as to generate image information to be outputted via the output 10 or the laser beam printer 11.

Figure 7:
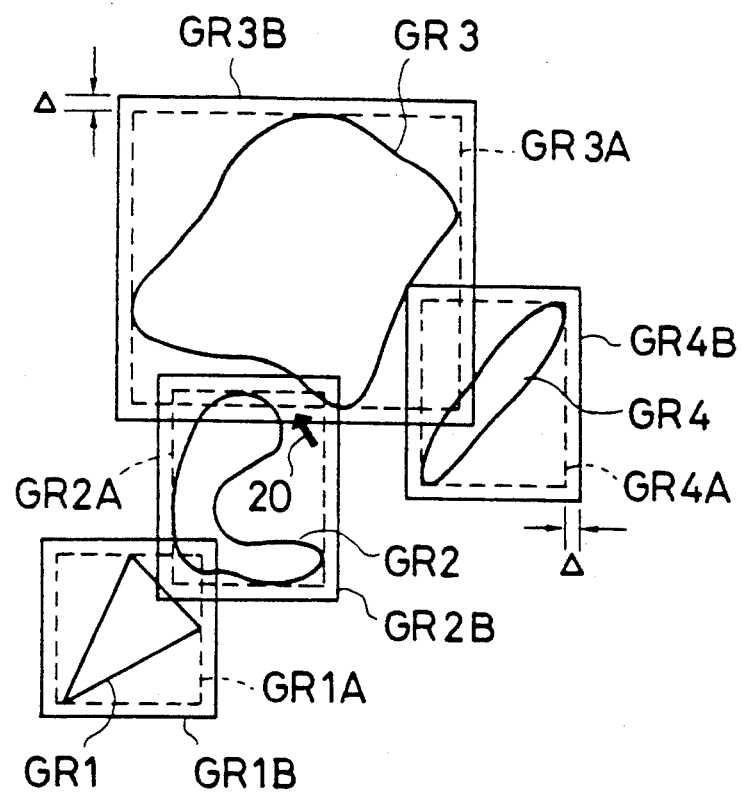
FIG. 7 is a diagram for explaining the pattern selecting method of this invention.
Figure 8:
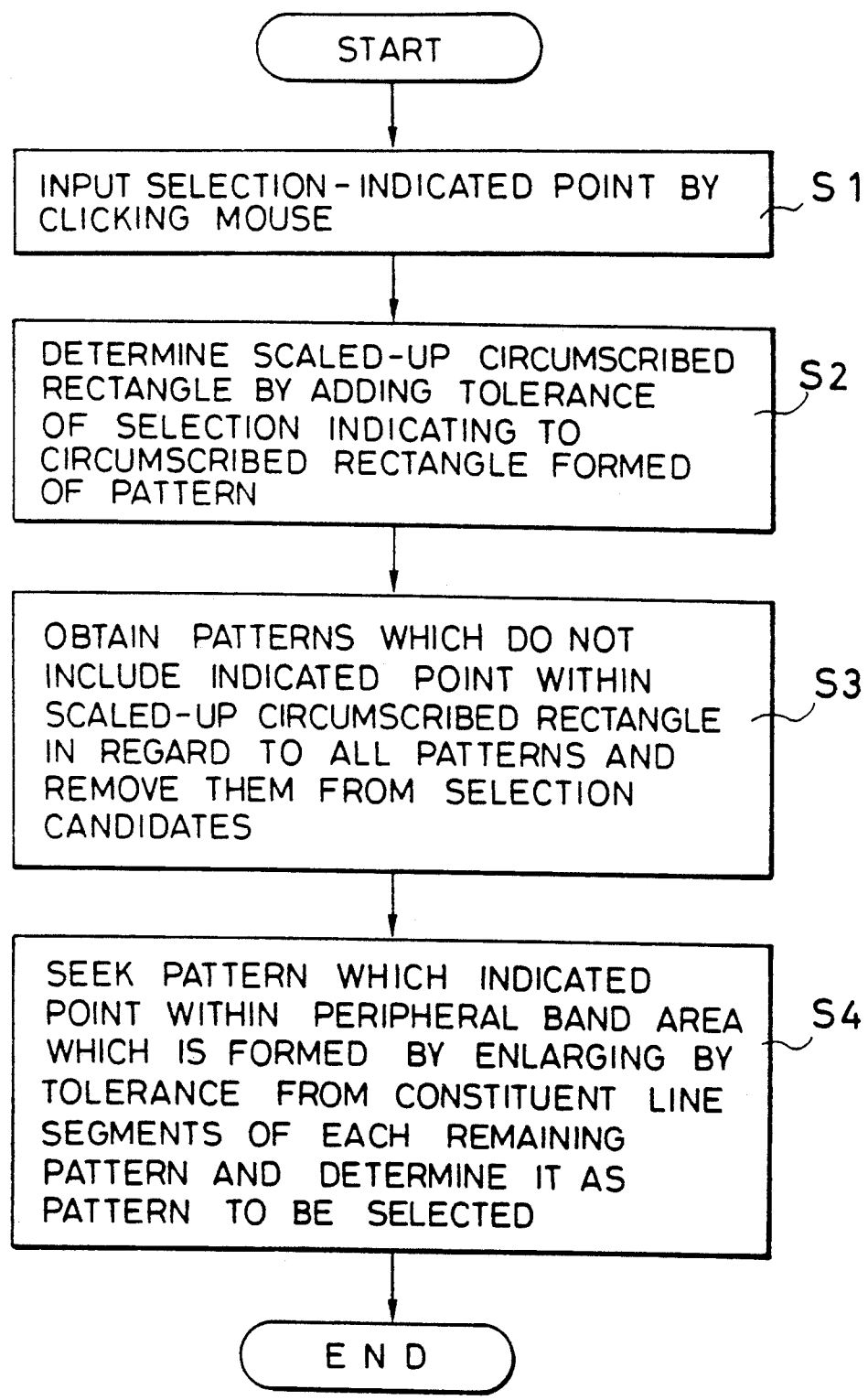
FIG. 8 is a flow chart showing an operational example of this invention.

In the work station 300 of the image processing system as described above, it is assumed that patterns GR1 to GR4 as shown in FIG. 7 are displayed on the CRT. The operation of selecting any of these patterns will be explained hereinafter with reference to the flow chart shown in FIG. 8.

At first, a cursor 20 displayed on the CRT as shown in FIG. 7 is moved by means of the mouse and clicked near the pattern to be selected, thus inputting a selection indicating point (Step S1). Then, by adding a tolerance Δ of selection indicating to the circumscribed rectangles GR1A to GR4A formed of the patterns GR1 to GR4 respectively, scaled-up circumscribed rectangles GR1B to GR4B are generated to be determined (Step S2). With respect to each of patterns GR1 to GR4, a judgement on whether or not the indicated point is included is made to eliminate patterns not including the point from the selection candidates (Step S3). With regard to the patterns GR1 to GR4 of the FIG. 7, the patterns GR1 and GR4 are removed from the selection candidates since the indicated point by the cursor 20 belongs only to the scaled-up circumscribed rectangles GR2B and GR3B. In order to select a pattern, as required, from the remaining patterns, a pattern is to be found which includes the indicated point within the peripheral band area scaled up by the tolerance from the constituent elements of each patterns, thus determining the pattern to be selected (Step S4).

According to the pattern selecting method of this invention, in the image processing system wherein a large quantity of image data of characters and pictures can be edited and processed at a high speed in order to output a high quality image for printing in the layout-designed form, and wherein it is possible to easily make a bit maps of vector information by the hardware and further to easily image-process, manufacture and edit so as to make an output with characters and pictures being layout-designed; when a pattern is to be indicated among the patterns displayed on the display portion of the work station, it is possible to indicate and select the pattern to be chosen efficiently at a high speed.

It should be understood that many modifications and adaptations of the invention will become apparent to those skilled in the art and it is intended to encompass such obvious modifications and changes in the scope of the claims appended hereto.

What is claimed is:

1. A pattern selecting method, in an image processing system comprising an input controller means for dotting and compressing density data for an image read out by an input unit and for temporarily storing said compressed image data in a buffer; a work station means for editing not only a code information edited by an editing input unit but also said image data by the use of an input operating means and a display means; a file server means connected to said input controller means and said work station means by bus lines for storing said image data, said code information and edited data picture-edited by said work station means in a memory means; and an image setter means for reading out said edited data stored in said memory means and subjecting said edited data to a required data processing to output the image on an image output unit, said method comprising the steps of:

processing circumscribed rectangles formed of a plurality of patterns displayed on said display means so as to make scaled-up circumscribed rectangles, scaled-up by the tolerance of each of said plurality of patterns, when one of said patterns is to be selected by means of said input operating means;

distinguishing, in regard to all displayed patterns, whether or not a point indicated by said input operating means is included in each of the scaled-up circumscribed rectangles in order to remove the patterns not including the indicated point from the selection candidates, seeking a pattern which includes the indicated point within the peripheral band area scaled up by the tolerance from the constituent line segments of each of the remaining patterns so as to determine the pattern to be selected.

2. A pattern selecting method as claimed in claim 1, wherein said processing step is performed by using a mouse connected to said work station means.

3. A pattern selecting method as claimed in claim 2, wherein said mouse moves a cursor on the display means and clicks a position to be selected.

* * * * *